J. B. AGNEW, Sr.
DEVICE FOR RECOVERING SUNKEN LOGS.
APPLICATION FILED MAR. 2, 1908.
905,620.
Patented Dec. 1, 1908.
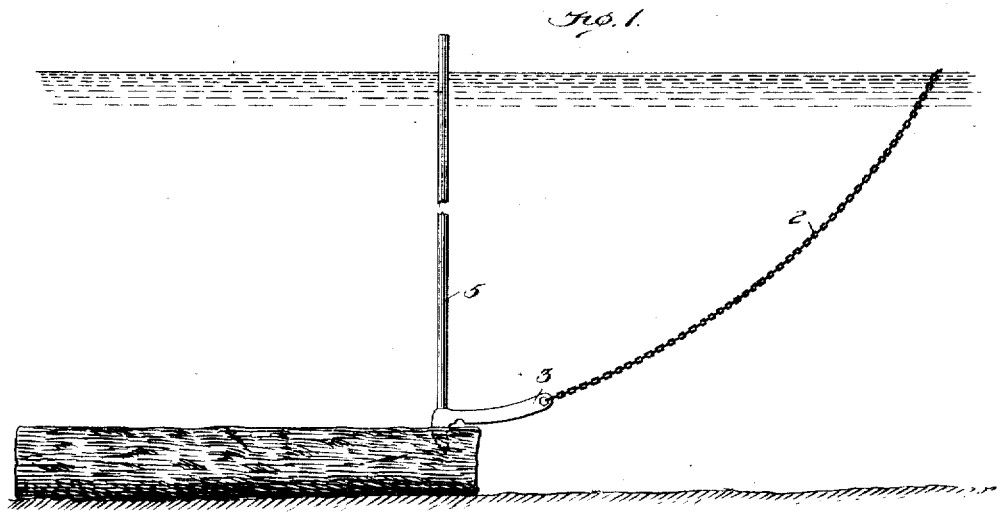
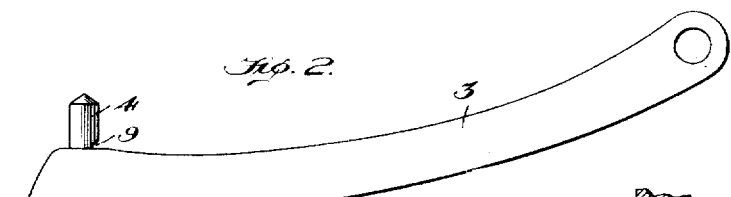
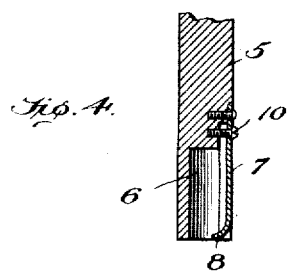
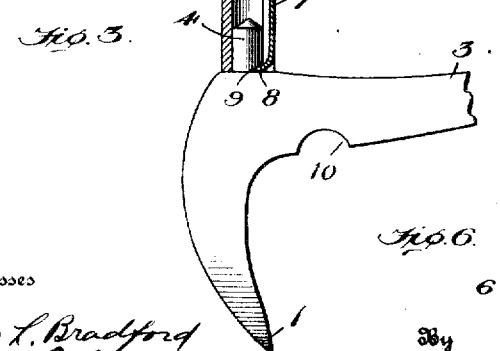
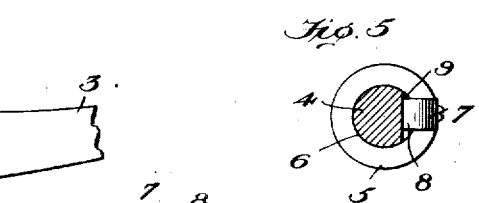
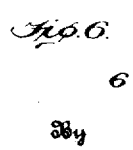
Witnesses
Edwin L. Bradford
Anne B. Johnson
Inventor
James B. Agnew Sr.
By Johnson & Johnson
Attorneys

UNITED STATES PATENT OFFICE.

JAMES BROWN AGNEW, SR., OF CURWENSVILLE, PENNSYLVANIA.

DEVICE FOR RECOVERING SUNKEN LOGS.

No. 905,620.

Specification of Letters Patent.

Patented Dec. 1, 1908.

Application filed March 2, 1908. Serial No. 418,833.

*To all whom it may concern:*

Be it known that I, JAMES BROWN AGNEW, Sr., a citizen of the United States, residing at Curwensville, in the county of Clearfield and State of Pennsylvania, have invented certain new and useful Improvements in Devices for Recovering Sunken Logs; and I do hereby declare the following to be a full, clear, and exact description of the invention, such as will enable others skilled in the art to which it appertains to make and use the same.

For recovering logs from the bottoms of rivers, streams or dams, I have produced a device having the form of a pick and the function of a dog which is driven into the log by a detachable drive-rod and the log is then drawn ashore by a line connected to the driven dog, and in the claims appended hereto I will point out the parts and combination of parts which constitute my invention, in connection with the accompanying drawings, in which,—

Figure 1 shows a log on the bottom of a river and my recovering dog device driven into it. Fig. 2 is an enlarged view of the driven dog device from which the drive-rod has been removed. Fig. 3 is a like view of the dog device and its drive-rod, the connection being in section to show the means for detaching the drive rod from the dog. Fig. 4 is a detail sectional view of the attaching end of the drive-rod showing its spring catch and socket. Fig. 5 is a horizontal section taken at the base of the stud looking upward and showing the spring catch of the drive-rod for locking engagement with the stud. Fig. 6 is a like view showing the drive-rod in the position in which it is rotated to disengage it by lifting it from the stud of the rod when the log is to be drawn ashore.

The log engaging part has the function of a dog and the form of a pick, the point 1 of which is driven into the log, while a pulling line 2, is connected to the end of the dog shank 3, the position of which is substantially parallel with the log when dogged thereto, so that the pull upon the log will be in the direction of its length.

A stud 4, projects from the heel of the handle about in a vertical line with the pick point and this stud serves as a hold for a drive-rod 5, the end of which forms a socket 6, to receive the dog stud and be fastened to it. The provision for rendering the drive-rod detachable is a spring-plate 7, fastened to the rod and terminating in a lip-catch 8, in a recessed part of the socket so as to engage a shoulder or notch 9, at the base of the stud to fasten the parts together which is done by pressing the socket end of the rod over the stud until the catch end of the spring enters the notch or recess in the stud. The drive-rod when thus fastened forms the handle for the dog and by which its point is set upon the log and driven therein by a hammer applied by the operator upon the top of the rod and for this purpose the rod is of a length greater than the depth of the water so that the handle end of the rod will always be above the water. The point of the dog having been driven into the log, the drive-rod is then detached from its fastening stud by rotating the rod to carry its spring catch out of engagement with the shoulder or notch of the stud and for this purpose the stud is cylindrical and the rod can be pulled off the stud without loosening the hold of the dog in the log. The function of the spring catch is to hold the drive rod and dog together while the device is being set down through the water upon the log, while the stud has a length sufficient to give the drive-rod a firm connection in the socket of the rod under the driving blows.

The device is used from a boat or any floating body to set and drive the dog and to remove the drive-rod and the pulling line is then carried to the shore and may be connected to any suitable power such as a windlass (not shown) for drawing the log. The pulling line however may have a fixed connection with the shore power and the line carried out to the place of the sunken log and when the dog is driven the operator will signal the shore to pull the log in. The holding function of the catch end of the spring may be made effective by an adjusting screw 10, of the spring plate to increase the tension of the spring. To increase the holding function of the dog its pick-point may be curved to give a safe hold.

An important advantage of the device is the construction by which the drive-rod when seated by its socket upon the shank stud, is engaged therewith and disengaged therefrom by rotating the drive-rod to the right or to the left upon the stud and at the same time pulling the drive-rod upward when it is desired to remove it from the stud.

In attaching the drive-rod by forcing its socket end upon the stud, the catch end of the spring will yield and by rotating the drive-rod the catch end will pass into the notch of the stud and to remove the drive-rod it is rotated to cause the catch end to pass out of the stud notch. A notch 10 may be made at the underside of the shank to receive a crow-bar when it is desired to draw the pick-point from the log.

I claim:

1. In a device for recovering sunken logs, a shank having a pulling line at one end, a pick-point at its other end substantially at right angles to the shank, a stud on the shank above the pick-point, a drive-rod having no fixed connection with the device, and means on the drive-rod and on the stud adapted for engagement and disengagement by the rotation of the rod upon the stud to automatically engage and disengage the rod from the stud.

2. In a device for recovering sunken logs, a shank having at one end a pick-point and a stud on the shank above the pick-point having a shouldered recess or notch at its base, the other end of the shank having a pulling line, and a drive-rod having a socket end, a spring catch secured to the socket end and adapted to be automatically engaged with and disengaged from the shouldered recess of the stud.

3. In a device for recovering sunken logs, a shank having at one end a pick-point, and a stud on the shank above the pick-point, the other end of the shank having a pulling line, and a drive-rod having a socket end, and means fastened to said rod and entering said socket adapted to engage the stud and to release said engagement by a rotation of the drive-rod on the stud.

In testimony whereof I have signed my name to this specification in the presence of two subscribing witnesses.

JAMES BROWN AGNEW, Sr.

Witnesses:
G. M. CLUTE,
JOHN A. DALE.